United States Patent
Kronsteiner et al.

(10) Patent No.: US 9,546,050 B2
(45) Date of Patent: Jan. 17, 2017

(54) METHOD AND DEVICE FOR STACKING AND UNSTACKING PANEL-SHAPED OBJECTS

(71) Applicant: LISEC AUSTRIA GMBH, Seitenstetten (AT)

(72) Inventors: Alexander Kronsteiner, Blindenmarkt (AT); Adrian Enzenbrunner, Steyr (AT); Hannes Endlicher, Melk (AT)

(73) Assignee: LISEC AUSTRIA GMBH, Seitenstetten (AT)

( * ) Notice: Subject to any disclaimer, the term of this patent is extended or adjusted under 35 U.S.C. 154(b) by 18 days.

(21) Appl. No.: 14/407,551

(22) PCT Filed: Jan. 30, 2014

(86) PCT No.: PCT/AT2014/000019
§ 371 (c)(1),
(2) Date: Dec. 12, 2014

(87) PCT Pub. No.: WO2014/117192
PCT Pub. Date: Aug. 7, 2014

(65) Prior Publication Data
US 2015/0151927 A1    Jun. 4, 2015

(30) Foreign Application Priority Data

Jan. 30, 2013 (AT) .................... A 66/2013

(51) Int. Cl.
*B65G 49/06* (2006.01)
*B65G 57/00* (2006.01)
*B65G 59/00* (2006.01)

(52) U.S. Cl.
CPC ........... *B65G 49/068* (2013.01); *B65G 49/061* (2013.01); *B65G 49/067* (2013.01); *B65G 57/00* (2013.01); *B65G 59/00* (2013.01); *B65G 2249/04* (2013.01)

(58) Field of Classification Search
CPC ..... B65G 49/068; B65G 49/061; B65G 57/00; B65G 59/00; B65G 49/067; B65G 2249/04
(Continued)

(56) References Cited

U.S. PATENT DOCUMENTS 1,959,216 A * 5/1934 Owen .................. B66C 1/0212
212/291
3,690,477 A * 9/1972 Nilsson ................ B65G 49/068
271/5

(Continued)

FOREIGN PATENT DOCUMENTS

CN         101842300        9/2010
DE         19544490 A1      6/1997
(Continued)

OTHER PUBLICATIONS

RU Office Action, dated Feb. 8, 2016; Application No. 2015104880/11.
(Continued)

*Primary Examiner* — Jeanette E Chapman
(74) *Attorney, Agent, or Firm* — Young & Thompson

(57) ABSTRACT

When handling panel-shaped objects, such as glass panes, a gripping device (4) is used in order to remove the objects from stacks (1, 2), in which the objects are inclined towards the vertical, or to position the objects onto stacks (1, 2), wherein the gripping device allows at least two stacks (1, 2) of objects to be formed on bearing blocks, the stacks (1, 2) differing from each other. The gripping device (4) has at least two grippers which are independent of each other. Suction heads (7) are provided as the grippers of the gripping device (4), the suction heads being pivotal independently of each other into and out of the suction head working position associated with the objects. In the process, (Continued)

Figure 1:
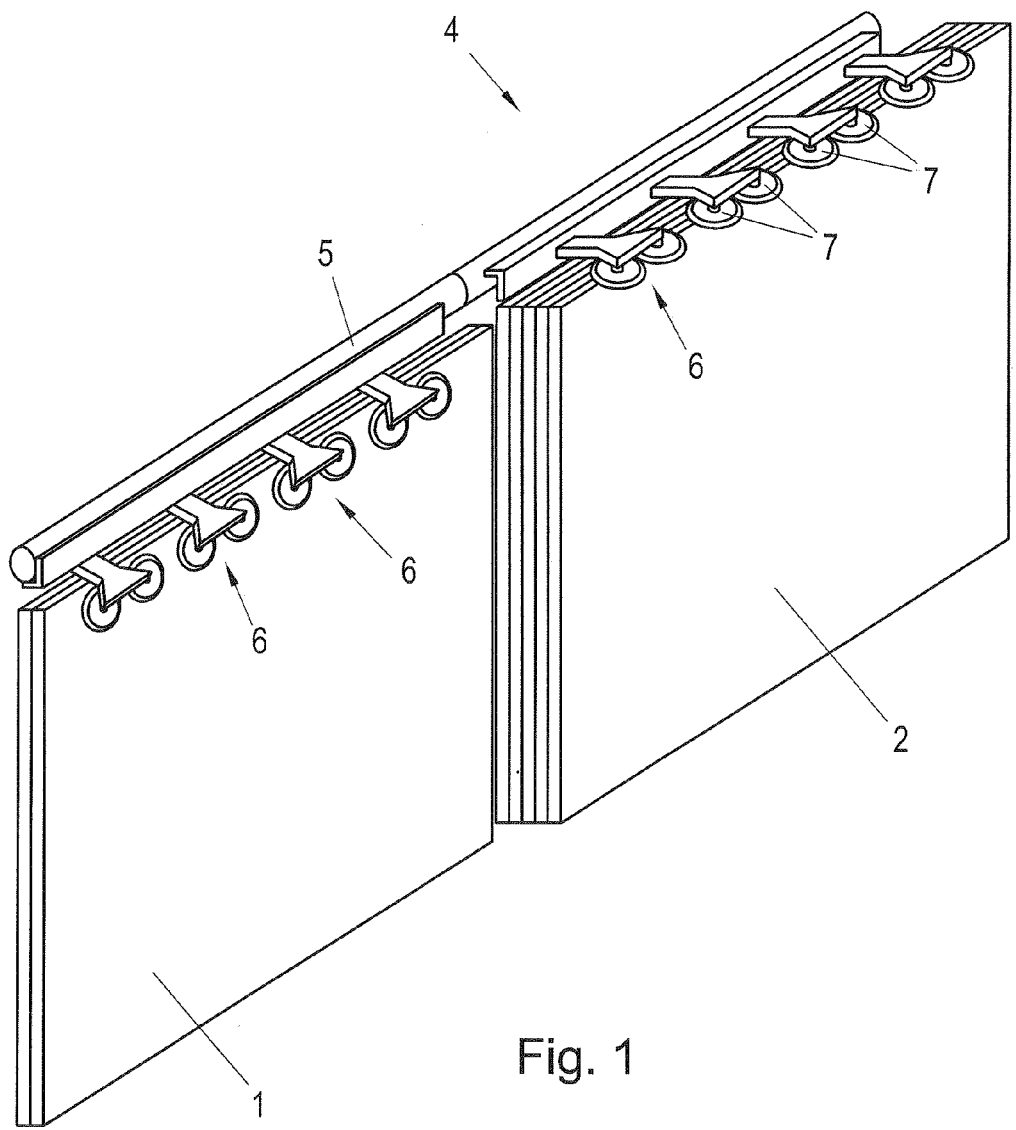

gripping device (4) suction heads (7) pivoted out of their operating position are arranged above the stacks (1, 2).

16 Claims, 4 Drawing Sheets

(58) Field of Classification Search
USPC ......... 414/744.1, 752.1, 753.1, 749.6, 751.1, 414/794.8, 793, 797, 737–741, 560–561; 901/40, 8.6; 294/65, 188; 271/107
See application file for complete search history.

(56) References Cited

U.S. PATENT DOCUMENTS

| | | | | |
|---|---|---|---|---|
| 3,693,321 | A * | 9/1972 | Nilsson | B65B 23/20 414/789.5 |
| 4,565,478 | A * | 1/1986 | Ericsson | B41F 21/06 271/12 |
| 5,102,114 | A * | 4/1992 | Suda | B65G 49/068 271/18 |
| 5,282,717 | A * | 2/1994 | Lohr | H05K 13/0061 198/803.13 |
| 5,387,068 | A * | 2/1995 | Pearson | B25J 15/0616 294/65 |
| 5,542,805 | A | 8/1996 | Lisec | |
| 5,609,377 | A | 3/1997 | Tanaka | |
| 6,024,530 | A * | 2/2000 | Kleineisel | B21D 43/05 414/752.1 |
| 6,626,629 | B2 | 9/2003 | Herbermann | B21D 43/055 414/737 |
| 7,134,833 | B2 * | 11/2006 | de Koning | B65G 47/917 198/468.3 |
| 7,329,083 | B2 * | 2/2008 | Nakazato | B65G 65/00 414/416.01 |
| 7,549,833 | B2 * | 6/2009 | Tang | B65G 49/067 414/737 |
| 7,690,706 | B2 * | 4/2010 | Wild | B65G 47/907 198/468.3 |
| 8,328,255 | B2 | 12/2012 | Franz et al. | |
| 8,391,999 | B2 * | 3/2013 | Chen | G05B 19/41865 219/490 |
| 8,931,999 | B2 * | 1/2015 | Dorner | B21D 43/24 414/752.1 |
| 2001/0045755 | A1 | 11/2001 | Schick et al. | |
| 2010/0012461 | A1 * | 1/2010 | Stauber | B65H 29/003 198/418.9 |
| 2013/0108408 | A1 * | 5/2013 | Saison | B65H 3/0816 414/797 |

FOREIGN PATENT DOCUMENTS

| | | |
|---|---|---|
| DE | 196 36 470 A1 | 3/1998 |
| DE | 19817426 A1 | 10/1999 |
| DE | 20 2012 010085 U1 | 12/2012 |
| EP | 0 425 960 | 7/1994 |
| EP | 0 509 960 | 6/1995 |
| EP | 0 675 060 B1 | 10/1995 |
| EP | 1 695 928 | 8/2006 |
| EP | 2070848 | 6/2009 |
| EP | 2301868 A1 | 3/2011 |
| FR | 2 525 196 A1 | 4/1982 |
| JP | 02088188 A * | 3/1990 |
| RU | 2092414 | 10/1997 |
| SU | 210744 | 12/1966 |
| SU | 277231 | 4/1969 |
| WO | 2009-056102 | 5/2009 |
| WO | 2012037582 A1 | 3/2012 |

OTHER PUBLICATIONS

AT Search Report, dated Dec. 2, 2013, from corresponding AT application.
International Search Report, dated May 12, 2014, from corresponding PCT application.
CN Office Action, dated Oct. 9, 2015; Application No. 201480001992.8.

* cited by examiner

METHOD AND DEVICE FOR STACKING AND UNSTACKING PANEL-SHAPED OBJECTS

BACKGROUND OF THE INVENTION

Field of the Invention

The invention relates to a method and a device for the stacking and de-stacking of panel-shaped items, such as glass panels.

Description of the Related Art

Devices for stacking and unstacking are known, in which connection reference can be made to FR 2 525 196 A, WO 2012/037582 A, or EP 0 675 060 B1.

Panel-shaped objects, especially glass panes, are kept ready in storage (glass storage)—in stacks on a bearing block, for example.

On the bearing blocks, the panel-shaped objects (glass panes) stand inclined a few degrees (5°, for example) with respect to the perpendicular so that they lean securely on the bearing block.

For the unloading ("stacking") and removal ("unstacking") of panel-shaped objects, beams are provided that are equipped with suction heads ("suction beams") and that are, for example, 6 meters long. The suction heads are applied to the upper edge of a panel-shaped object (glass pane) in order to raise the foremost object in each case from the stack and transport it for further handling or processing. For example, glass panes that have been removed ("unstacked") from a bearing block are transported to a glass-cutting table.

For gripping/removing/detaching panel-shaped objects, comb-like devices ("combs") are known. On the teeth of these combs, multiple (usually three) suction heads are arranged, so that the glass panes can be gripped over an extensive area. The comb-shape is chosen so that various devices that are outfitted with vacuum suction cups and used for conveying, storing, and transporting can feed glass panes to each other without it being necessary to suction-grip the panels from both sides (which would be damaging to coatings, for example).

Suction beams that are not divided into independent segments are known from FR 2 525 196 A.

It is problematic when different types of glass stand on the bearing block—for example, stacks of glass panes of different widths, or stacks of glass panes having the same or different glass types with different thicknesses. As a consequence, it used to be absolutely necessary to remove glass panes from each stack simultaneously. Only in this way was it possible to prevent the development of different stack thicknesses which make it impossible to work with gripping devices that are designed continuously over the length of the bearing block, even when these are designed as suction beams.

SUMMARY OF THE INVENTION

The object of the invention is to propose a method and a device of the type mentioned at the outset, with which the previously described problems do not occur.

This task is accomplished according to the invention on the one hand with a method that has the characteristics of claim 1, and on the other with a device in which the characteristics of the independent claim, directed at the device, are realized.

Preferred and advantageous embodiments of the invention are the subject matter of the dependent claims.

In one possible embodiment of the method according to the invention, it may be provided that at least two stacks are formed on a bearing block, whereby the stacks are different from one other.

In one possible embodiment of the method according to the invention, it may be provided that stacks are formed from different panel-shaped objects.

In one possible embodiment of the method according to the invention, it may be provided that at least two stacks of different thicknesses are formed when at least one panel-shaped object is added to at least one of the stacks or at least one panel-shaped object is removed from at least one of the stacks.

The device according to the invention can distinguish itself in one embodiment in that suction heads are provided as the grippers of the gripping device and that a source for creating an underpressure is assigned to them.

The device according to the invention can distinguish itself in one embodiment in that the grippers of the gripping device can be adjusted independently of each other into and out of their working position associated with the objects.

The device according to the invention can distinguish itself in one embodiment in that the grippers of the gripping device can be adjusted into and out of their working position through swiveling or linear movements, especially raising and lowering.

The device according to the invention can distinguish itself in one embodiment in that the grippers of the gripping device are arranged on a common beam.

The device according to the invention can distinguish itself in one embodiment in that the gripping device has at least two groups with at least one gripper, especially with at least two grippers, each.

The device according to the invention can distinguish itself in one embodiment in that the groups can be adjusted, especially pivoted, independently of each other into and out of the working position of the grippers.

The device according to the invention can distinguish itself in one embodiment in that the connection between the source for underpressure and suction heads that have been adjusted into their ready position is interrupted.

The device according to the invention can distinguish itself in one embodiment in that suction heads that have been adjusted in their working position are connected to the source for underpressure.

The device according to the invention can distinguish itself in one embodiment in that a device for moving in the space, e.g. a device in the style of a gantry crane, is assigned to the beam.

The device according to the invention can distinguish itself in one embodiment in that grippers of the gripping device that have been adjusted out of their working position are arranged above stacks.

Through the invention it is possible to position two or more stacks, for example stacks of various types of objects (e.g. types of glass), as two different stacks on a (single) bearing block and to remove objects from only one of the stacks and transport them away.

The invention makes it further possible to stack panel-shaped objects to form different stacks.

This is possible because the device according to the invention has a gripping device with at least two grippers that work independently of each other.

For example, the gripping devices have suction heads as grippers. These suction heads are connected to at least one source of underpressure, so that they can, by way of underpressure, be attached to a panel-shaped object (glass pane)

in order to grip the same and either remove it from a stack that is leaning on a bearing block or deposit it on a bearing block.

In a different embodiment, the gripping devices have transport forks as gripping devices; these are combined into at least two groups of at least two transport forks each.

The transport forks each possess preferably at least two carrying elements that are, for example, largely L-shaped. The objects to be stacked/unstacked stand, on the one hand, on the lower, shorter (essentially horizontal) limbs of the carrying elements (meaning they are supported by these from beneath); on the other hand, they lean against the longer (essentially vertical) limbs of the carrying elements.

In one embodiment, the transport forks are affixed on horizontal carriers (pivotable where applicable) such that they protrude downward from the carriers.

Suction heads can be arranged on the essentially vertical limbs of the carrying elements in order to secure objects held by the grippers during transport.

Even with grippers in the form of transport forks, two independently working groups with at least two carrying elements each are provided next to each other. This makes it possible to deposit/remove independent objects onto/from two stacks that are arranged next to each other without the thicker stack getting in the way of the gripping device. This is particularly the case when, as is provided in a possible embodiment, the L-shaped carrying elements can be pivoted away into/out of their working position.

This advantageous effect is also present in the embodiment of the gripping device with the grippers that are designed as swiveling suction heads or in the embodiment with carrying elements that, as necessary, can be removed and redeployed.

In one possible embodiment of the invention, it is provided that the grippers of the gripping device are transport forks.

In one possible embodiment of the invention, it is provided that each transport fork has at least two essentially L-shaped carrying elements.

In one possible embodiment of the invention, it is provided that suction heads are provided on the transport forks, especially on their essentially vertical limbs.

In one possible embodiment of the invention, it is provided that the carrying elements of the transport forks are arranged on beams, preferably separated from these in the downward direction.

In one possible embodiment of the invention, it is provided that the beams of at least two transport forks are fastened detachably on a main beam.

In one possible embodiment of the invention, it is provided that the transport forks can pivot into and out of their working position.

In one possible embodiment of the invention, it is provided that the carrying elements of the transport forks are designed essentially vertical in their working space.

In one possible embodiment of the invention, it is provided that the essentially vertical limbs of the carrying elements are designed to be of variable length.

In one possible embodiment of the invention, it is provided that the grippers with suction heads are combined with grippers with transport forks.

In one possible embodiment of the invention, it is provided that suction heads and transport forks are able to pivot independently of each other into and out of their working position.

Within the scope of the invention, it has also been considered to combine grippers in the form of transport forks with gripping devices that have grippers designed as suction heads. This makes it possible to securely transport heavy objects with grippers in the form of suction heads.

According to the invention, it is possible to individually activate in each case only the grippers of the gripping device that are assigned to a stack of at least two stacks on a bearing block, whereby the remaining grippers of the gripping device remain idle.

If the grippers of the gripping device according to the invention are suction heads, it is possible to move, for example to pivot, only the suction head (or two or more suction heads) that is (are) necessary into its (their) working position; in contrast, suction heads that are not necessary and that are arranged in the vicinity of a stack from which no panel-shaped object (glass pane) is to be removed can remain in their ready position.

With the invention it is advantageously possible to store two or more different glass types or glass panes in stacks with different widths and/or thicknesses on a single bearing block. Thereby, during the removal process only the at least one gripper of the gripping device is activated (for example, only the at least one suction head is moved into its working position) that is necessary for the removal of the desired glass type. This can take place without the remaining grippers (the remaining suction heads) of the gripping device colliding with one or more of the nearby stacks of other objects (glass types).

For instance, grippers of the gripping device that are not necessary, for example unnecessary suction heads, remain in their ready position above the stack. Only the necessary grippers (suction heads) are moved into their working position.

Moving the grippers out of the ready position into their working position and out of their working position into their ready position can be done by pivoting the grippers or by linear movement (up and down movement). Additionally, combinations of pivoting with raising and lowering of the grippers are also considered within the scope of the invention.

With the invention the advantage is also realized that multiple, less-wide stacks of identical or different glass types can fit on a single bearing block and therefore, even with a large variety of glass types, storage space can be saved.

If the gripping device provided according to the invention has suction heads as grippers, it is considered to combine the suction heads into at least two groups of at least two suction heads each.

Further details and characteristics of the invention will become clear from the following description of embodiment examples with the aid of the drawings.

BRIEF DESCRIPTION OF THE DRAWING FIGURES

Figure 2:
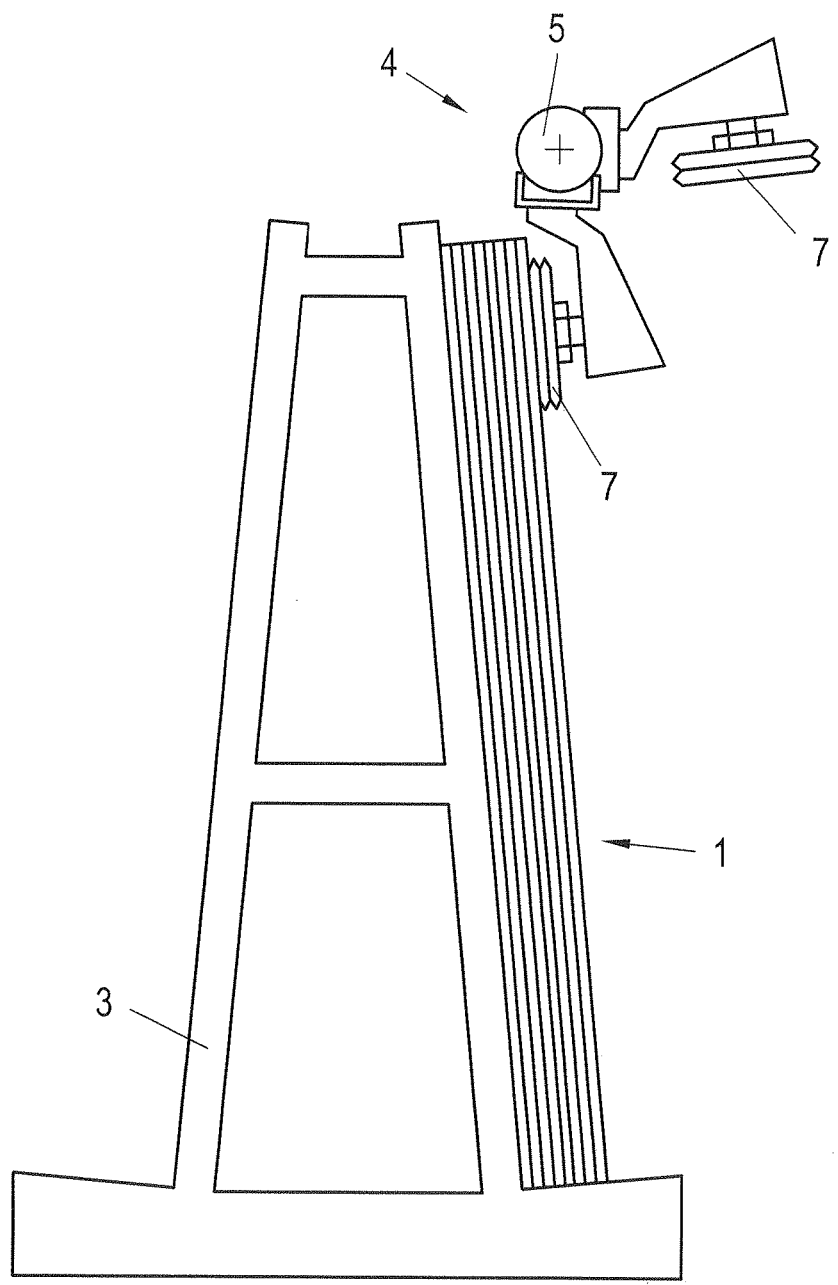
Figure 3:
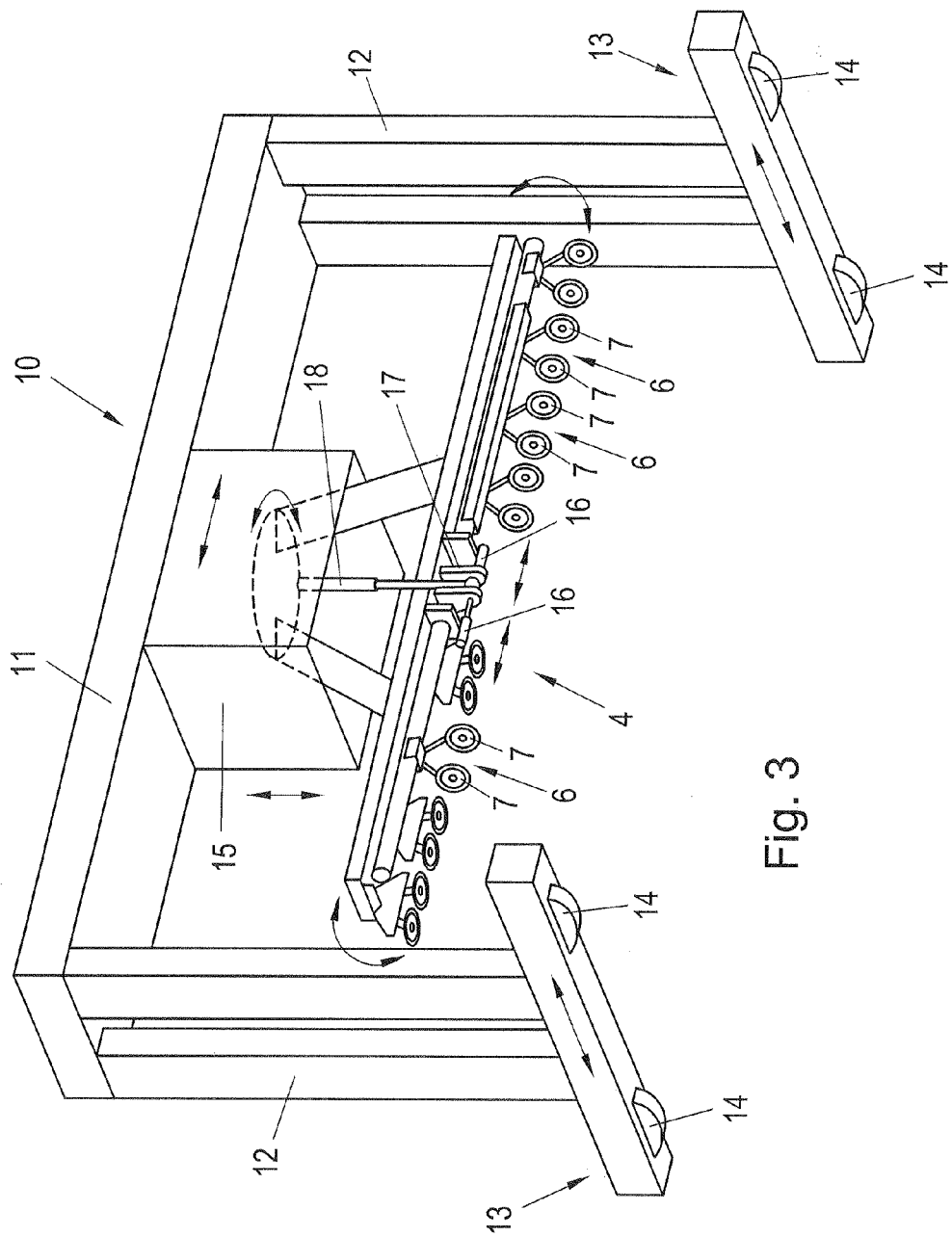
Figure 4:
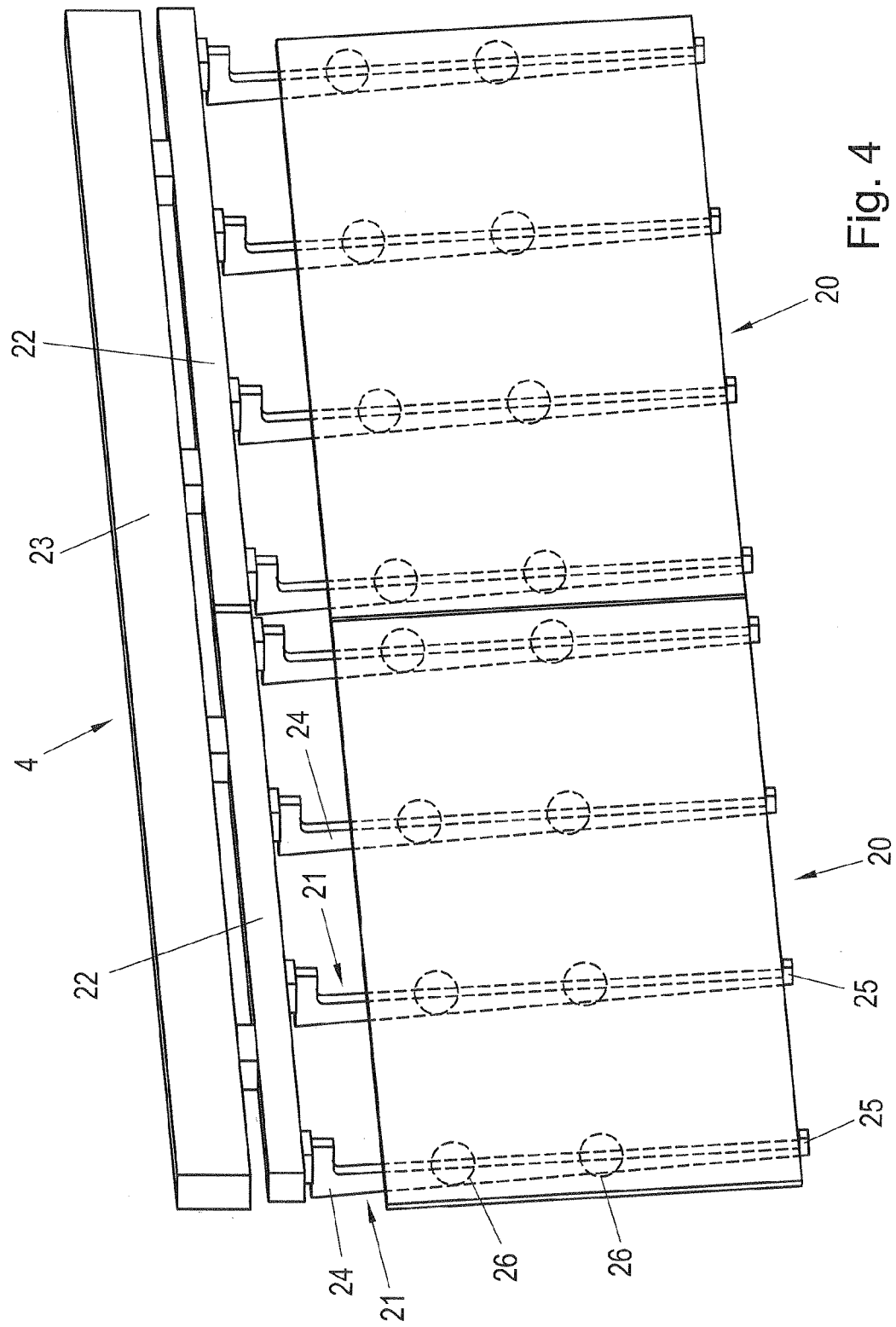

FIG. 1 shows: a device according to the invention (without a bearing block), in schematic form, FIG. 2 shows: the device from FIG. 1 (with a bearing block) from the side, FIG. 3 shows: a device according to the invention combined with a crane, and FIG. 4 shows: an embodiment of a gripping device with grippers in the form of transport forks.

DETAILED DESCRIPTION OF THE INVENTION

In the embodiment shown in FIG. 1, two stacks 1 and 2 (glass batches) with different thicknesses and/or with different glass types (e.g. glass of different widths) stand on a bearing block 3 (not shown in FIG. 1).

A gripping device 4, designed as a suction beam in the example, is provided for removing glass panes from stacks 1 and 2 (glass batches). This gripping device has multiple groups 6, each with two grippers, mounted to pivot on a beam 5. In the example, the grippers each have two suction heads 7 that can be supplied with underpressure.

Although in the embodiment example the grippers of the gripping device 4, designed as suction heads 7, are pivotable, another embodiment of the device is considered in which the grippers designed as suction heads 7 can be moved by means of linear raising and lowering into their ready position and out of this into their working position. A combination of linear movement and pivoting of the grippers is also possible.

In FIG. 1 it is shown that four groups 6, each comprising two suction heads 7, are pivoted into their working position (in the example, pivoted downward), so that the suction heads 7, after being supplied with underpressure, can suck onto—that is grip—the foremost glass pane of the stack 1 and remove it from the stack 1. This occurs because the beam 5 is moved with the help of a drive of arbitrary design.

FIG. 1 also shows that the groups 6 of suction heads 7, assigned to the stack 2 (the right-hand stack in FIG. 1), remain pivoted into their ready position so that they are arranged above the stack 2 and do not hinder the movements of the gripping device 4 with its groups 6 of suction heads 7 that are pivoted into their working position. This is seen in FIG. 2.

The invention also provides for the suction heads 7, located in their ready position (meaning the suction heads 7 that have not been pivoted into their working position) to be separated from the source of underpressure, meaning they are not supplied with underpressure.

Only suction heads 7 that have been pivoted into their working position (in FIG. 1, the four left groups 6 of suction heads 7) are supplied with underpressure by connecting them to the source of underpressure as soon as they have been applied to glass panes of a stack 1 or 2.

The beam 5 can be connected to a device for adjusting, for example a gantry crane 10 (compare FIG. 3), for moving the beam 5 of the gripping device 4 in order to arrange the suction heads 7 that serve as grippers (provided on the beam 5) over the foremost glass pane of a stack 1 or 2 (glass batch).

In the device shown in FIG. 3, which is designed as a gantry crane 10, a gripping device 4 according to the invention is provided. The gantry crane 10 has a horizontal beam 11 and can be moved via rollers 14 over a chassis 13 comprising two legs 12. In this way the gripping device 4 can be brought close to a bearing block 3 (on which stacks 1 and 2 stand with glass panes) when glass panes are to be deposited (stacked) on the bearing block 3 in order to form stacks 1 or 2 or are to be removed (unstacked) from a stack 1 or 2 standing on the bearing block 3.

On the beam 11 of the gantry crane 10, a gripping device 4 is arranged that can pivot with multiple degrees of freedom. The gripping device 4 can, for example, be linearly moved vertically over the suspension 15 (perpendicular to the beam 11), horizontally (parallel to the beam 11 and perpendicular to the movement direction of the gantry crane 10), and can be rotated about a perpendicular axis.

FIG. 3 shows, exemplarily, that suction heads 7 are combined into four groups 6, each comprising two suction heads 7, on the beam 5 of the gripping device 4. The number of the groups 6 of suction heads 7 is not, however, limited to four, just as the number of suction heads 7 per group 6 is not limited to two.

As is indicated by linear motors 16 in FIG. 3, the distance between suction heads 7 and the distance between groups 6 of suction heads 7 can be variable.

Pivoting the suction heads 7 out of their ready position into their working position (left-hand side in FIG. 1) and out of their working position into their ready position (right-hand side in FIG. 1) can be done with the help of a lever 17, shown in FIG. 3, with a drive 18 (linear motor).

In FIG. 3 it is shown that, for the part of the gripping device 4 that is on the left in FIG. 3, not all suction heads 7 or groups 6 of suction heads 7 necessarily need to be pivoted simultaneously; rather, consideration is given to pivoting only the actually necessary suction heads 7 or groups 6 of suction heads 7 into their working position. Consideration is thus given to pivoting into their working position only as many suction heads 7 or groups 6 of suction heads 7 as are necessitated by the width of the glass pane being handled.

If, in one embodiment of the invention, it is provided that a predefined number of suction heads 7 or groups 6 of suction heads 7 is always pivoted into their working position, it can also be provided that suction heads 7 that are not gripping a glass pane (meaning suction heads 7 that are in their ready position) are not connected to the source for underpressure, meaning they are not supplied with underpressure.

The invention also calls for pivoting, collectively, all suction heads 7 (functioning as grippers) of the gripping device 4 according to the invention or groups 6 of the same within one area of the beam 5 (for example a half, a third, a fourth, or another segment of the beam 5) into and out of their working position. Consideration is, however, also given to using only individual suction heads 7 or groups 6 of suction heads 7 when smaller (narrower) glass panes are to be handled (stacked/unstacked).

The method according to the invention of stacking and unstacking of panel-shaped objects like glass panes proceeds such that at least two stacks are formed on a single bearing block, whereby the stacks are different from each other. These are, for example, stacks of different objects (glass types), meaning objects with differing dimensions (width and/or length and/or thickness), or stacks of variable thickness that can be unstacked or stacked independently of each other by removing or depositing objects from the bearing block.

With the method according to the invention, it is possible to form stacks from different panel-shaped objects, for example objects with different dimensions (width and/or length and/or thickness). For instance, at least two stacks that have different thicknesses are formed in that at least one panel-shaped object is deposited onto at least one of the stacks or at least one panel-shaped object is removed from at least one of the stacks.

The embodiment of a gripping device 4 shown in FIG. 4 has, in place of grippers with suction heads 7 as grippers, two transport forks 20. The transport forks 20 comprise, in the embodiment shown, four L-shaped carrying elements 21 that are mounted on horizontal beams 22 such that the L-shaped carrying elements 21 protrude downward from these. The beams 22 are removably arranged on a main beam 23.

The two groups shown in the example, of transport forks 20 (each having four carrying elements 21) can, after they have been removed from the main beam 23, be held ready for new use in storage containers. While one transport fork 20 is being removed, the other transport fork 20 that remains on the main beam 23 can be used to stack/unstack.

The carrying elements 21 each have a longer, essentially vertical limb 24 and a shorter, essentially horizontal limb 25. The horizontal limbs 25 support objects that are to be transported and that are gripped by the gripping device 4 from below. The objects lean thereby on the vertical limbs 24 of the carrying elements 21. In order to hold objects securely on the transport forks 20, the carrying elements 21 can be fitted with suction heads 26 on their vertical limbs 24.

The longer, essentially vertical limbs 24 of the carrying elements 21 can be designed to be length-adjustable (telescoping, for example).

The transport forks 20 or at least their carrying elements 21 can, as described above for the embodiment with suction heads 7, be pivoted out of their working position shown in FIG. 4 as well as out of their ready position back into the working position. When one of the transport forks 20 has been pivoted out of its working position, objects can be removed (unstacked) from neighboring stacks of panel-shaped objects and deposited (stacked) in such stacks, even when the stacks are not of the same thickness. This function is also possible when a transport fork 20, comprising a group of carrying elements 21, has been received from the main beam 23.

Apart from that, the embodiment shown in FIG. 4 of a gripping device 4 can be used in the same manner that has been explained above for the embodiment shown in FIGS. 1-3.

Additionally, the advantage of greater freedom of movement and, optionally, shorter paths arises because the transport forks 20 can be removed from the main beam 23 and because the main beam 23 can be moved over stacks and/or bearing blocks and the like in a warehouse.

Within the scope of the invention, an embodiment is considered in which the gripping device 4 of the embodiment shown in FIGS. 1-3 is combined with a gripping device 4 of the embodiment from FIG. 4.

With such a combined gripping device, it may be provided that suction heads 7 and transport forks 20 are able to pivot independently of each other between the respective ready position and the working position.

The method of the invention can advantageously be executed with the help of a device according to the invention.

In summary, an embodiment of the invention can be described as follows:

When handling panel-shaped objects, such as glass panes, a gripping device 4 is used in order to remove said objects from stacks 1, 2, in which the objects are inclined with respect to the vertical, or to position said objects onto stacks 1, 2, wherein the gripping device 4 allows at least two stacks 1, 2 of objects to be formed on bearing blocks, said stacks 1, 2 differing from each other. The gripping device 4 has at least two grippers which are independent of each other. Suction heads 7 are provided as the grippers of the gripping device 4 with said suction heads being able to pivot independently of each other into and out of the suction head working position associated with the objects. In the process, gripping device 4 suction heads 7 pivoted out of their operating position are arranged above the stacks 1, 2.

The invention claimed is:

1. A device for stacking and de-stacking of panel-shaped items, or glass panels, comprising:
   at least two different stacks, side-by-side on a bearing platform, in which the items or panels stand inclined to vertical, are stacked by placement of the panel-shaped items or panels, and are de-stacked by the removal of the panel-shaped items or panels, using a gripping device for purposes of capturing the items, wherein
   the gripping device comprises at least two sections side-by-side, each section having at least one gripper, or each section having at least two grippers,
   the grippers are configured to be moved by swiveling movements or linear movements, or raising/lowering linear movements, that are independent of one another, into and out of their operative positions associated with items, and
   the grippers when moved out of their operating positions are arranged above stacks.

2. The device in accordance with claim 1,
wherein
suction heads are provided as the grippers, with which a source of reduced pressure is associated.

3. The device in accordance with claim 1,
wherein
transport forks are provided as the grippers.

4. The device in accordance with claim 3,
wherein
each transport fork has at least two essentially L-shaped load-bearing elements.

5. The device in accordance with claim 3,
wherein
suction heads are provided on the transport forks, or on the transport fork's essentially vertical arms.

6. The device in accordance with claim 4,
wherein
the load-bearing elements of the transport forks are arranged on beams, or are protruding downwards from the beams.

7. The device in accordance with claim 3,
wherein
the transport forks are detachably mounted on a main beam.

8. The device in accordance with claim 2,
wherein
the grippers with suction heads are combined with grippers with transport forks.

9. The device in accordance with claim 1,
wherein suction heads and transport forks can be swiveled independently of one another into and out of their respective operative positions.

10. The device in accordance with claim 2,
wherein
transport forks are provided as the grippers.

11. The device in accordance with claim 4,
wherein suction heads are provided on the transport forks, on their essentially vertical arms.

12. The device in accordance with claim 5,
wherein
the load-bearing elements of the transport forks are arranged on beams, protruding downwards from the beams.

13. The device in accordance with claim 4,
wherein
the transport forks are detachably mounted on a main beam.

14. The device in accordance with claim 5,
wherein
the transport forks are detachably mounted on a main beam.

15. The device in accordance with claim 6, wherein
   the transport forks are detachably mounted on a main beam.

16. The device in accordance with claim 2, wherein the grippers with suction heads are combined with grippers with transport forks, and each transport fork has at least two essentially L-shaped load-bearing elements.

* * * * *